(12) United States Patent
Lin

(10) Patent No.: US 12,473,104 B2
(45) Date of Patent: Nov. 18, 2025

(54) UNMANNED AERIAL DEVICE

(71) Applicant: Taiwan Flying Vehicle Co., Ltd., Hsinchu (TW)

(72) Inventor: Yao-Chang Lin, Hsinchu (TW)

(73) Assignee: Taiwan Flying Vehicle Co., Ltd., Hsinchu (TW)

( * ) Notice: Subject to any disclaimer, the term of this patent is extended or adjusted under 35 U.S.C. 154(b) by 0 days.

(21) Appl. No.: 18/668,966

(22) Filed: May 20, 2024

(65) Prior Publication Data

US 2025/0162737 A1   May 22, 2025

(30) Foreign Application Priority Data

Nov. 20, 2023   (TW) ................................ 112212598

(51) Int. Cl.
| | |
|---|---|
| *B64U 50/10* | (2023.01) |
| *B64U 20/70* | (2023.01) |
| *B64U 30/40* | (2023.01) |

(52) U.S. Cl.
CPC ............. *B64U 50/10* (2023.01); *B64U 20/70* (2023.01); *B64U 30/40* (2023.01)

(58) Field of Classification Search
CPC ........ B64U 50/10; B64U 20/70; B64U 30/40; F42B 15/00; F42B 15/10; B64D 27/30; B64D 33/02; B64D 27/20; B64D 27/33
See application file for complete search history.

(56) References Cited

U.S. PATENT DOCUMENTS

| | | | | |
|---|---|---|---|---|
| 2,750,733 A * | 6/1956 | Paris | ........................ | F02K 7/075 60/39.77 |
| 3,059,878 A * | 10/1962 | Kerry | ................... | B64C 29/0075 244/23 B |
| 3,097,817 A * | 7/1963 | Towzey, Jr. | ............. | B64C 15/02 244/209 |
| 3,202,383 A * | 8/1965 | Le Bel | ................... | B64C 23/005 244/209 |
| 3,336,753 A * | 8/1967 | Mullen, II | ................ | F02K 9/78 60/225 |
| 3,417,564 A * | 12/1968 | Call | ........................... | F02C 5/12 60/248 |
| 3,507,463 A * | 4/1970 | Kuntz | .................... | B64C 29/005 244/55 |
| 3,576,300 A * | 4/1971 | Palfreyman | ............ | B64D 27/20 244/1 N |
| 3,659,424 A * | 5/1972 | Polk, Jr. | .................. | B64D 33/02 60/245 |
| 3,680,814 A * | 8/1972 | Geary | ....................... | B64B 1/00 244/13 |

(Continued)

*Primary Examiner* — Medhat Badawi

(57) ABSTRACT

An unmanned aerial device includes a body, a heat-generating assembly, and a propulsion assembly. The body has a head end, an airflow guide space, and a tail end. The head end is opposite to the tail end, and the airflow guide space is located between the head end and the tail end. The head end has an air intake, and the tail end has an exhaust vent. The airflow guide space is communicated with the air intake and the exhaust vent. The heat-generating assembly is disposed in the airflow guide space. The propulsion assembly is connected to the tail end, and the propulsion assembly is adapted to generate a propulsion airflow through the air intake, the heat-generating assembly, and the exhaust vent.

12 Claims, 8 Drawing Sheets

(56) References Cited

U.S. PATENT DOCUMENTS

| | | | | |
|---|---|---|---|---|
| 3,936,017 A * | 2/1976 | Blythe | B64D 33/06 | 181/259 |
| 3,942,746 A * | 3/1976 | Carter | B64C 1/0009 | 244/113 |
| 3,985,317 A * | 10/1976 | Geraci | B64C 39/068 | 244/45 R |
| 4,007,896 A * | 2/1977 | Reynolds, III | B64C 9/14 | 244/113 |
| 4,019,699 A * | 4/1977 | Wintersdorff | B64D 7/00 | 244/121 |
| 4,033,526 A * | 7/1977 | Benson | B64C 21/01 | 244/209 |
| 4,131,252 A * | 12/1978 | Dean | B64C 9/16 | 244/130 |
| 4,182,503 A * | 1/1980 | Muscatell | B64C 3/48 | 244/113 |
| D254,903 S * | 5/1980 | Holmen | D12/333 | |
| 4,265,416 A * | 5/1981 | Jackson | B64G 1/14 | 244/159.3 |
| 4,291,853 A * | 9/1981 | Sigalla | B64C 23/06 | 244/199.1 |
| 4,369,940 A * | 1/1983 | Kelly | F02K 7/105 | 244/53 A |
| 4,378,097 A * | 3/1983 | Ferguson | B64D 33/02 | 137/15.1 |
| D269,669 S * | 7/1983 | Hancock | D12/338 | |
| 4,392,621 A * | 7/1983 | Viets | B64C 9/38 | 137/829 |
| 4,447,022 A * | 5/1984 | Lion | B64D 33/06 | 244/45 R |
| 4,483,497 A * | 11/1984 | Rethorst | B64C 30/00 | 244/119 |
| 4,519,560 A * | 5/1985 | Ishimitsu | B64D 39/00 | 244/45 R |
| 4,537,371 A * | 8/1985 | Lawhorn | F42B 10/663 | 244/3.22 |
| 4,598,885 A * | 7/1986 | Waitzman | B64C 23/076 | 244/45 R |
| 4,712,752 A * | 12/1987 | Victor | B64C 3/28 | 244/129.1 |
| 4,767,083 A * | 8/1988 | Koenig | B64C 21/025 | 244/12.3 |
| 4,778,109 A * | 10/1988 | Jourdain | F02K 1/006 | 244/110 B |
| 4,784,353 A * | 11/1988 | Sigalla | B64C 5/06 | 244/91 |
| 4,810,021 A * | 3/1989 | Burst | B62D 35/02 | 296/180.1 |
| D300,938 S * | 5/1989 | Delaney | D21/447 | |
| 4,838,502 A * | 6/1989 | Pinson | F42B 10/42 | 244/49 |
| 4,899,958 A * | 2/1990 | Horikawa | B64D 33/02 | 137/15.1 |
| D307,259 S * | 4/1990 | Holt | D12/345 | |
| 4,966,338 A * | 10/1990 | Gordon | B64C 23/06 | 244/54 |
| 4,969,614 A * | 11/1990 | Capuani | B64C 39/10 | 244/12.3 |
| D319,805 S * | 9/1991 | Wiegert | D12/333 | |
| 5,054,721 A * | 10/1991 | Brenholt | B64C 29/0008 | 244/210 |
| 5,062,588 A * | 11/1991 | Garland | B64C 29/0066 | 244/23 B |
| 5,071,088 A * | 12/1991 | Betts | B64C 29/0066 | 244/45 R |
| 5,076,512 A * | 12/1991 | Farbridge | B64C 15/02 | 244/12.4 |
| 5,217,349 A * | 6/1993 | Succi | B64C 27/467 | 416/223 R |
| 5,316,032 A * | 5/1994 | DeCoux | F15D 1/10 | 137/829 |
| 5,513,591 A * | 5/1996 | Quartarone | B63B 13/02 | 114/337 |
| 5,700,169 A * | 12/1997 | Jones | B63J 99/00 | 440/46 |
| 5,769,358 A * | 6/1998 | Hahl | B64C 1/0009 | 244/218 |
| 5,806,791 A * | 9/1998 | Hatalsky | F02K 9/805 | 244/3.25 |
| 5,806,808 A * | 9/1998 | O'Neil | B64C 21/025 | 244/204 |
| 5,813,628 A * | 9/1998 | Hahl | B64C 39/00 | 244/218 |
| 5,901,929 A * | 5/1999 | Banks | B64C 23/00 | 244/130 |
| 5,947,417 A * | 9/1999 | Cameron | B64D 1/06 | 244/129.5 |
| 6,014,940 A * | 1/2000 | Jacobson | B60V 1/22 | 244/233 |
| 6,056,237 A * | 5/2000 | Woodland | B64D 1/02 | 244/49 |
| 6,142,417 A * | 11/2000 | Figge, Sr. | B64D 33/02 | 137/15.1 |
| 6,168,217 B1 * | 1/2001 | Kruger | E05B 81/22 | 292/201 |
| 6,520,738 B2 * | 2/2003 | Sheoran | F15D 1/04 | 415/205 |
| 6,575,406 B2 * | 6/2003 | Nelson | B64C 3/32 | 244/119 |
| D477,561 S * | 7/2003 | Nelson | D12/319 | |
| 6,584,764 B2 * | 7/2003 | Baker | F02C 7/042 | 137/15.1 |
| D479,501 S * | 9/2003 | Nelson | D12/319 | |
| 6,651,928 B1 * | 11/2003 | Stuhr | B64C 7/02 | 244/102 R |
| 6,659,396 B1 * | 12/2003 | August | B64C 3/16 | 244/45 R |
| 6,793,175 B1 * | 9/2004 | Sanders | B64C 30/00 | 137/15.1 |
| 6,866,233 B2 * | 3/2005 | Patel | F42B 10/668 | 244/209 |
| 6,896,003 B1 * | 5/2005 | Gieseke | B63G 8/32 | 137/833 |
| 6,923,403 B1 * | 8/2005 | Dizdarevic | B64C 1/0009 | 244/36 |
| 6,926,229 B2 * | 8/2005 | Cummings | B64D 27/20 | 244/12.5 |
| D526,951 S * | 8/2006 | Houck, II | D12/319 | |
| 7,093,794 B2 * | 8/2006 | Leyva | B64D 27/02 | 244/54 |
| 7,100,867 B2 * | 9/2006 | Houck, II | B63B 1/248 | 244/45 R |
| 7,114,685 B1 * | 10/2006 | Schulein | F42B 10/04 | 244/199.1 |
| 7,143,983 B2 * | 12/2006 | McClure | B64C 15/14 | 244/90 A |
| 7,201,347 B2 * | 4/2007 | Boe | B64C 13/16 | 244/221 |
| 7,338,011 B2 * | 3/2008 | Pauly | B64C 9/30 | 244/91 |
| 7,357,351 B2 * | 4/2008 | Schmidt | F15D 1/10 | 244/210 |
| 7,448,578 B2 * | 11/2008 | Clark | B64C 1/0009 | 244/45 R |
| 7,641,144 B2 * | 1/2010 | Kummer | B64C 3/141 | 244/12.5 |
| 7,644,888 B2 * | 1/2010 | Eakins | B64C 1/0009 | 244/119 |
| 7,644,892 B1 * | 1/2010 | Alford, Jr. | B64C 23/065 | 244/35 R |
| D622,653 S * | 8/2010 | Moore | D12/319 | |
| 7,793,884 B2 * | 9/2010 | Dizdarevic | B64C 39/12 | 244/36 |
| 7,823,840 B2 * | 11/2010 | Shmilovich | B64C 21/04 | 244/215 |
| 7,851,733 B2 * | 12/2010 | Geswender | F42B 10/38 | 244/3.22 |

(56) References Cited

U.S. PATENT DOCUMENTS

| | | | |
|---|---|---|---|
| 7,861,966 B2 * | 1/2011 | Rethorst | B64C 30/00 244/1 N |
| 7,878,798 B2 * | 2/2011 | Poe | F23D 14/08 431/278 |
| 7,900,865 B2 * | 3/2011 | Moore | B64D 27/20 244/54 |
| 7,900,868 B2 * | 3/2011 | Sankrithi | B64D 33/06 244/1 N |
| 7,946,209 B2 * | 5/2011 | Schneider | F42C 19/06 89/6 |
| 8,016,233 B2 * | 9/2011 | Moore | B64C 5/08 244/119 |
| 8,033,510 B2 * | 10/2011 | Shmilovich | B64C 9/22 244/209 |
| 8,056,852 B1 * | 11/2011 | Dizdarevic | B64C 5/02 244/45 R |
| 8,083,183 B2 * | 12/2011 | Grossein | B64D 33/08 244/209 |
| 8,087,618 B1 * | 1/2012 | Shmilovich | B64C 9/38 244/215 |
| 8,096,500 B2 * | 1/2012 | Burgos Gallego | B64C 9/02 244/89 |
| 8,123,160 B2 * | 2/2012 | Shepshelovich | B64D 15/163 244/45 R |
| 8,152,095 B2 * | 4/2012 | Cazals | B64D 33/02 244/55 |
| 8,240,125 B2 * | 8/2012 | Kawai | B64C 15/02 239/265.17 |
| 8,262,031 B2 * | 9/2012 | Zha | B64C 21/025 244/36 |
| 8,313,055 B2 * | 11/2012 | Gall | B64D 27/02 244/45 R |
| 8,387,912 B2 * | 3/2013 | Houck, II | B64C 39/062 244/45 R |
| 8,393,566 B2 * | 3/2013 | Siercke | B61D 27/00 137/15.1 |
| 8,485,476 B2 * | 7/2013 | Zha | B64C 21/025 244/36 |
| 8,628,040 B2 * | 1/2014 | Moore | B64C 5/08 244/119 |
| 8,657,226 B1 * | 2/2014 | McGinnis | B64C 39/08 244/45 R |
| 8,888,038 B2 * | 11/2014 | Bichler | B64D 27/16 244/55 |
| 9,016,638 B2 * | 4/2015 | Dahl | B64C 9/20 244/113 |
| 9,108,725 B1 * | 8/2015 | Shmilovich | B64C 21/08 |
| 9,193,436 B2 * | 11/2015 | Bernhardt | B64C 9/00 |
| 9,340,281 B2 * | 5/2016 | Harrison | B64C 23/06 |
| 9,381,995 B2 * | 7/2016 | Mores | B64C 9/06 |
| 9,410,485 B2 * | 8/2016 | Laurant | B64C 7/02 |
| 9,545,993 B2 * | 1/2017 | McGinnis | B64C 31/02 |
| 9,611,034 B1 * | 4/2017 | Suciu | B64C 21/01 |
| 9,714,082 B2 * | 7/2017 | Shmilovich | B64C 21/04 |
| 9,783,305 B2 * | 10/2017 | Hormiere | B64D 13/006 |
| 9,873,503 B2 * | 1/2018 | Chandrasekharan | B64C 9/00 |
| 10,077,739 B2 * | 9/2018 | James | F02K 1/763 |
| 10,093,411 B1 * | 10/2018 | Adamson | B64C 30/00 |
| 10,106,246 B2 * | 10/2018 | Zha | B64C 21/025 |
| 10,112,696 B2 * | 10/2018 | Chandler | B64D 33/02 |
| 10,207,812 B2 * | 2/2019 | Evulet | F02C 6/04 |
| 10,252,792 B2 * | 4/2019 | Hutcheson | B64C 9/12 |
| 10,308,350 B2 * | 6/2019 | Shmilovich | B64C 21/04 |
| 10,315,754 B2 * | 6/2019 | Zha | B64C 21/025 |
| 10,435,163 B2 * | 10/2019 | Gallet | B64D 27/14 |
| 10,464,668 B2 * | 11/2019 | Evulet | B64D 27/20 |
| D868,627 S * | 12/2019 | Evulet | D12/319 |
| 10,526,072 B2 * | 1/2020 | Shmilovich | B64C 21/04 |
| 10,543,899 B2 * | 1/2020 | Whitehouse | B64C 23/06 |
| 10,549,845 B2 * | 2/2020 | Epstein | B64C 1/0009 |
| 10,569,856 B2 * | 2/2020 | Akhmejanov | B64U 20/00 |
| 10,683,077 B2 * | 6/2020 | Zha | F15D 1/0055 |
| 10,799,396 B2 * | 10/2020 | Takeuchi | B29C 66/83413 |
| 10,836,481 B2 * | 11/2020 | Groninga | B64C 39/08 |
| 10,842,689 B2 * | 11/2020 | Takaishi | A61F 13/51476 |
| 10,850,832 B2 * | 12/2020 | González | B64C 3/14 |
| 10,852,111 B1 * | 12/2020 | Recchia | F42B 10/06 |
| 10,906,657 B2 * | 2/2021 | Schwarz | B64D 27/31 |
| 10,974,816 B2 * | 4/2021 | Mortland | B64C 13/28 |
| 11,001,378 B2 * | 5/2021 | Evulet | B64C 3/16 |
| 11,045,360 B2 * | 6/2021 | Furuhashi | A61F 13/532 |
| 11,091,259 B2 * | 8/2021 | Pierce | B64C 39/12 |
| 11,103,389 B2 * | 8/2021 | Takahashi | A61F 13/4902 |
| 11,105,264 B2 * | 8/2021 | Todorovic | F02C 7/04 |
| 11,111,025 B2 * | 9/2021 | Zha | B64D 15/04 |
| 11,111,029 B2 * | 9/2021 | Hoisington | B64C 21/01 |
| 11,148,801 B2 * | 10/2021 | Evulet | B64C 3/10 |
| 11,164,560 B2 * | 11/2021 | Clyburn | F01N 13/085 |
| 11,221,608 B2 * | 1/2022 | Goto | G06N 5/04 |
| 11,267,577 B2 * | 3/2022 | Mondal | B64C 5/10 |
| 11,293,293 B2 * | 4/2022 | Zha | F04D 29/685 |
| 11,338,927 B2 * | 5/2022 | Abramian | B64D 27/20 |
| 11,377,219 B2 * | 7/2022 | Kupratis | B64D 27/33 |
| 11,463,045 B2 * | 10/2022 | Takeuchi | H03B 5/04 |
| 11,473,500 B2 * | 10/2022 | Cicchini | F42B 15/10 |
| 11,597,501 B2 * | 3/2023 | Page | B64C 7/00 |
| 11,634,212 B1 * | 4/2023 | Giannini | B64D 29/02 244/7 C |
| D1,000,347 S * | 10/2023 | Chew | D12/319 |
| 11,771,602 B2 * | 10/2023 | Sakai | A61F 13/49012 604/385.16 |
| 11,845,549 B2 * | 12/2023 | Tulloch | B64C 3/185 |
| 11,920,617 B2 * | 3/2024 | Zha | F15D 1/12 |
| 11,964,772 B2 * | 4/2024 | Sobanski | F04D 29/542 |
| 11,993,376 B2 * | 5/2024 | Tulloch | B64C 9/20 |
| 12,071,224 B2 * | 8/2024 | Sato | B64C 21/01 |
| 12,071,239 B2 * | 8/2024 | Tulloch | B64C 9/16 |
| 12,097,953 B2 * | 9/2024 | Tulloch | B64C 9/18 |
| 12,202,602 B2 * | 1/2025 | Zha | B64C 9/02 |
| 2008/0041265 A1 * | 2/2008 | Geswender | F02K 7/10 102/476 |
| 2011/0036938 A1 * | 2/2011 | Blomeley | B64C 39/04 244/65 |
| 2013/0045087 A1 * | 2/2013 | Pontes | B64C 7/02 415/148 |
| 2018/0283205 A1 * | 10/2018 | Fracchia | F04D 29/38 |
| 2018/0334243 A1 * | 11/2018 | Lin | B64D 35/04 |
| 2019/0170087 A1 * | 6/2019 | Lin | F02K 1/004 |
| 2020/0189758 A1 * | 6/2020 | Abramian | B64D 27/32 |
| 2021/0095616 A1 * | 4/2021 | Lin | B64D 27/18 |
| 2022/0332417 A1 * | 10/2022 | Lin | B64C 15/02 |

* cited by examiner

UNMANNED AERIAL DEVICE

FIELD OF THE INVENTION

The present invention relates to an aerial device, and more particularly to an unmanned aerial device.

BACKGROUND OF THE INVENTION

In general, unmanned aerial devices are aerial devices that do not need boarding and piloting by pilots, and unmanned aerial devices can be controlled by means of remote control, navigation, or automatic piloting. Furthermore, unmanned aerial devices can be equipped with cameras or video cameras for aerial photographing, and are therefore widely used in the fields of film and television works, scientific research, military reconnaissance, and disaster relief. In addition, some unmanned aerial devices can also be equipped with pesticide spraying systems to be applied in the agricultural field. However, most of the known unmanned aerial devices have the problem of poor heat dissipation efficiency, which not only easily causes electronic part failure, but also leads to the loss of control of the aerial devices.

SUMMARY OF THE INVENTION

The present invention provides an unmanned aerial device to improve the heat dissipation efficiency.

In order to achieve one of or part of or all the purposes above or other purposes, the unmanned aerial device provided in the present invention comprises a body, a heat-generating assembly, and a propulsion assembly. The body has a head end, an airflow guide space, and a tail end. The head end is opposite to the tail end, and the airflow guide space is located between the head end and the tail end. The head end has an air intake, and the tail end has an exhaust vent. The airflow guide space is communicated with the air intake and the exhaust vent. The heat-generating assembly is disposed in the airflow guide space. The propulsion assembly is connected to the tail end, and the propulsion assembly is adapted to generate a propulsion airflow through the air intake, the airflow guide space, and the exhaust vent.

In one embodiment of the present invention, the heat-generating assembly comprises, for example, a battery and a control module. The control module is connected to the battery and the propulsion assembly.

In one embodiment of the present invention, the unmanned aerial device can further comprise a first fairing and a second fairing, where the first fairing is connected to the side of the propulsion assembly facing away from the tail end; and the second fairing is connected to the side of the first fairing facing away from the propulsion assembly. The first fairing is adapted to swing relative to the propulsion assembly in a first direction. The second fairing is adapted to swing together with the first fairing relative to the propulsion assembly in the first direction and is adapted to swing relative to the first fairing in a second direction.

In one embodiment of the present invention, the unmanned aerial device further comprises, for example, a first connector, a first steering drive element, a second connector, and a second steering drive element. The first connector is fixed to the propulsion assembly. The first steering drive element is connected to the first connector and the first fairing and is adapted to drive the first fairing to swing relative to the first connector in the first direction. The second connector is fixed to the first fairing. The second steering drive element is connected to the second connector and the second fairing and is adapted to drive the second fairing to swing relative to the second connector in the second direction.

In one embodiment of the present invention, the first fairing has, for example, a rotating axis, and the first fairing is adapted to swing in the first direction by taking the rotating axis as an axis. In a direction parallel to the rotating axis, the width of the second fairing is less than the width of the first fairing.

In one embodiment of the present invention, the unmanned aerial device further comprises, for example, a plurality of airflow deflectors. The airflow deflectors are fixed in the first fairing and the second fairing and extend in the direction.

In one embodiment of the present invention, the unmanned aerial device can further comprise a structural reinforcement plate. The body has an inner surface surrounding the airflow guide space. The inner surface is located between the head end and the tail end and has two side parts facing each other. The structural reinforcement plate is located in the airflow guide space and is fixed to the two side parts.

In one embodiment of the present invention, the heat-generating assembly can be fixed to the structural reinforcement plate.

In one embodiment of the present invention, the structural reinforcement plate extends, for example, from the head end to the tail end.

In one embodiment of the present invention, the body can comprise a main body and an airflow increase cover. The head end and the tail end are located on two opposite sides of the main body. The main body surrounds the airflow guide space and has an opening communicated with the airflow guide space. The airflow increase cover covers the opening and has an airflow increase opening communicated with the opening. The propulsion assembly is more adapted to generate the propulsion airflow through the airflow increase opening and the opening.

In one embodiment of the present invention, the airflow increase cover has, for example, a front side and a rear side. The front side is opposite to the rear side, the front side faces the side of the body having the head end. The airflow increase opening is located on the front side.

In one embodiment of the present invention, the unmanned aerial device can further comprise a nose. The head end further has a connecting part. The nose is fixed to the connecting part and exposes the air intake.

In one embodiment of the present invention, the head end further has, for example, a plurality of rib parts. An inner surface of the body extends to the head end and surrounds the air intake. The air intake surrounds the connecting part, and the rib parts are connected to the connecting part and the inner surface.

The unmanned aerial device in the present invention uses the body with the airflow guide space, and the heat-generating assembly is disposed in the airflow guide space. Furthermore, the propulsion airflow generated by the propulsion assembly can flow through the heat-generating assembly and then be discharged out of the body from the exhaust vent after passing through the heat-generating assembly. Therefore, the propulsion airflow generated by the propulsion assembly can quickly dissipate the heat of the heat-generating assembly out of the body, thereby effectively improving the heat dissipation efficiency of the unmanned aerial device.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
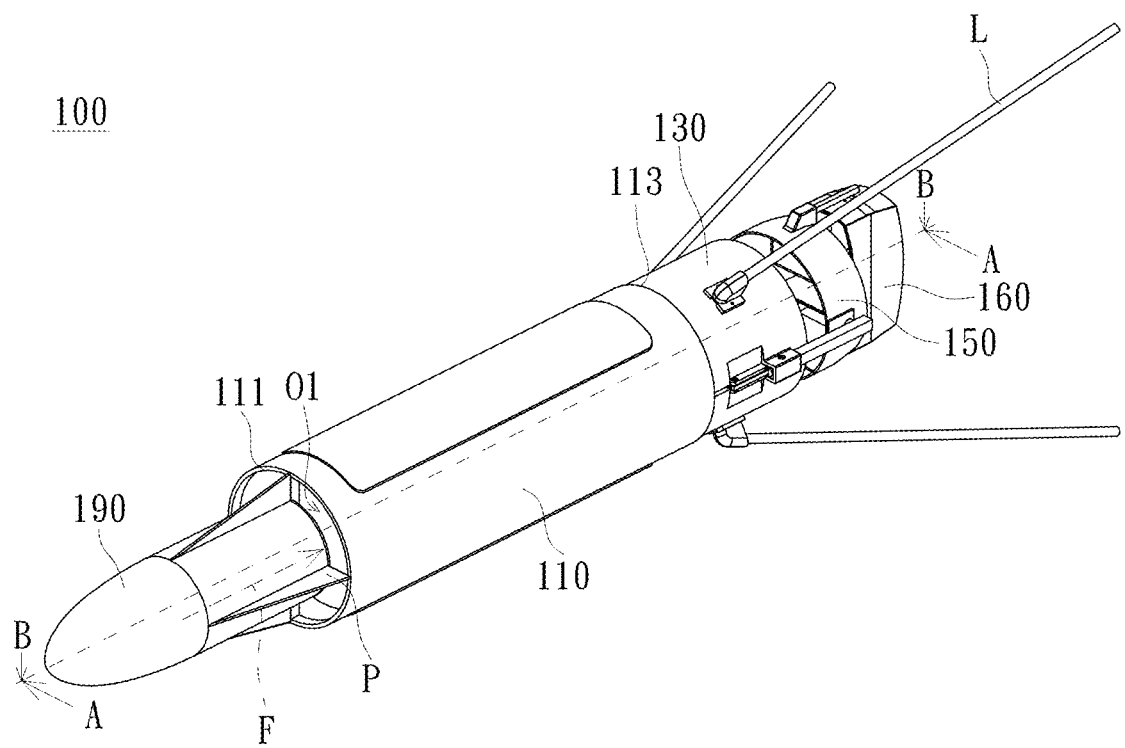
FIG. 1 is a three-dimensional schematic diagram of an unmanned aerial device in one embodiment of the present invention.
Figure 2:
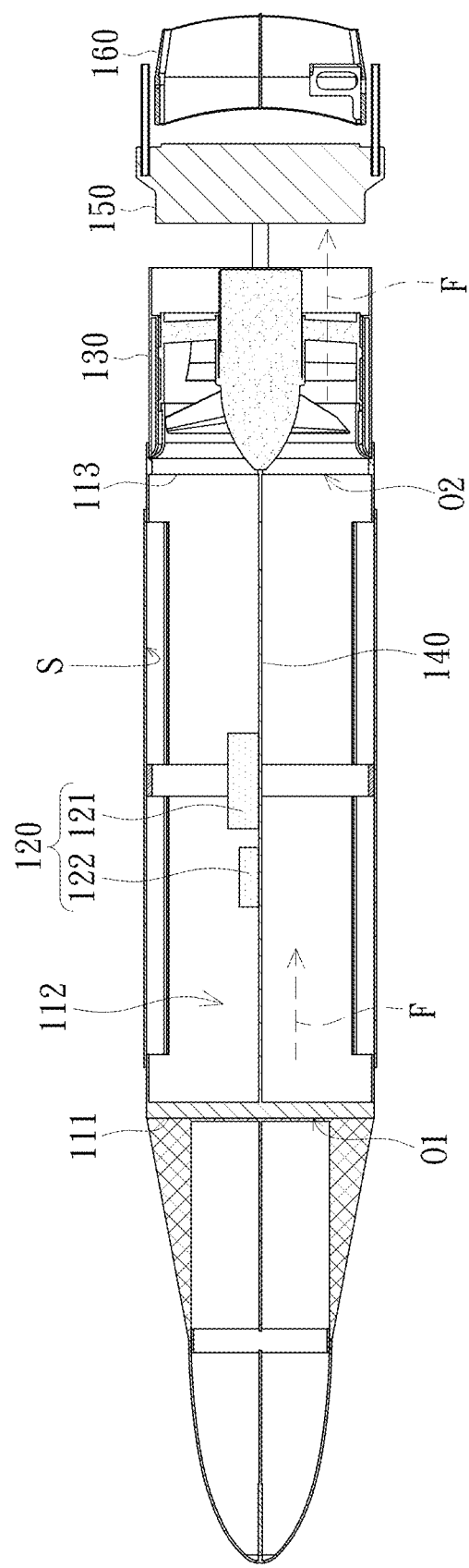
FIG. 2 is a cross-sectional view of the unmanned aerial device, taken along line A-A in FIG. 1.

FIG. 1 is a three-dimensional schematic diagram of an unmanned aerial device in one embodiment of the present invention. FIG. 2 is a cross-sectional view of the unmanned aerial device, taken along line A-A in FIG. 1. Reference is made to FIG. 1 and FIG. 2. The unmanned aerial device 100 includes a body 110, a heat-generating assembly 120 (drawn in FIG. 2), and a propulsion assembly 130. The body 110 has a head end 111, an airflow guide space 112 (drawn in FIG. 2), and a tail end 113. The head end 111 is opposite to the tail end 113, and the airflow guide space 112 is located between the head end 111 and the tail end 113. The head end 111 has an air intake O1, and the tail end 113 has an exhaust vent O2. The airflow guide space 112 is communicated with the air intake O1 and the exhaust vent O2. The heat-generating assembly 120 is disposed in the airflow guide space 112. The propulsion assembly 130 is connected to the tail end 113, and the propulsion assembly 130 is adapted to generate a propulsion airflow F through the air intake O1, the airflow guide space 112, and the exhaust vent O2.

The side of the body 110 close to the tail end can be provided with a landing gear L, but the specific structure of the landing gear L is not limited to that shown in FIG. 1. It should be noted that the landing gear L in FIG. 1 is omitted in FIG. 2, thereby clearly showing other features of the unmanned aerial device 100. In this embodiment, the body 110 is, for example, in the shape of a hollow cylinder, two opposite openings of the hollow cylinder can be the air intake O1 and the exhaust vent O2 respectively, and an internal space of the hollow cylinder can be the airflow guide space 112. However, the shape of the body 110 is not limited in the present invention.

Figure 3:
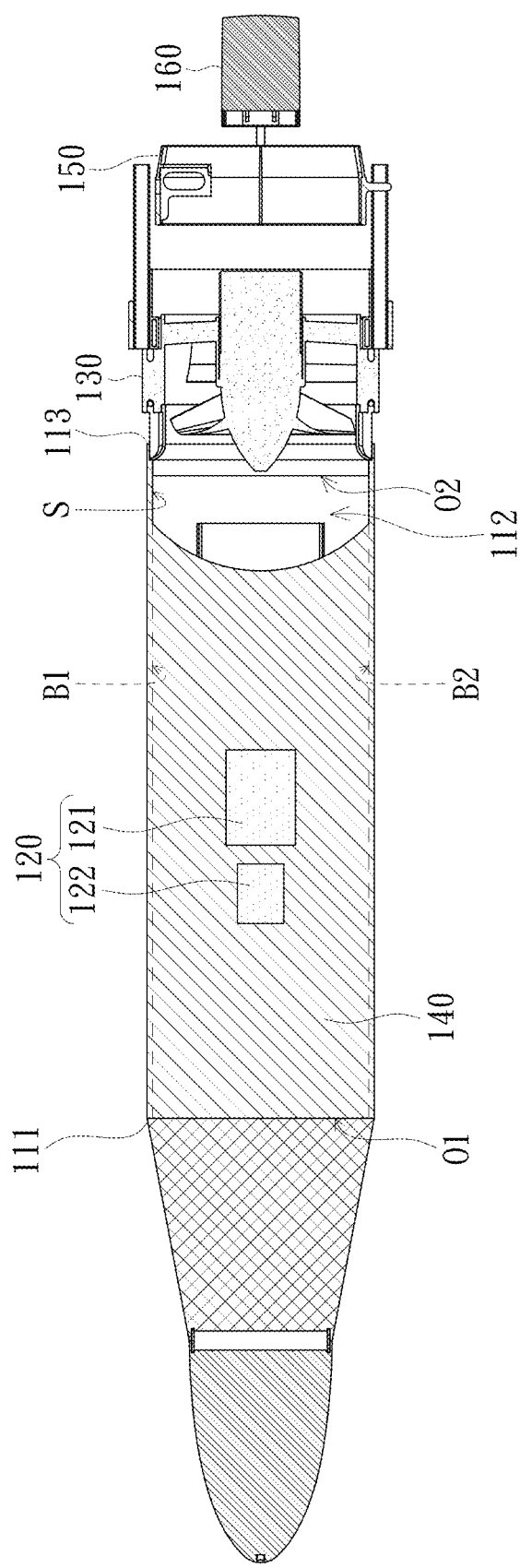
FIG. 3 is a cross-sectional view of the unmanned aerial device, taken along line B-B in FIG. 1.

FIG. 3 is a cross-sectional view of the unmanned aerial device, taken along line B-B in FIG. 1. It should be noted that the landing gear L in FIG. 1 is omitted in FIG. 3, thereby clearly showing other features of the unmanned aerial device 100. Reference is made to FIG. 2 and FIG. 3. In this embodiment, the unmanned aerial device 100 can further include a structural reinforcement plate 140. The body 110 has an inner surface S surrounding the airflow guide space 112. The inner surface S is located between the head end 111 and the tail end 113 and has side parts B1 and B2 facing each other (drawn in FIG. 3). The structural reinforcement plate 140 is located in the airflow guide space 112 and is fixed to the side parts B1 and B2. Specifically, the structural reinforcement plate 140 can enhance the structural strength of the body 110 and can be used for fixing the heat-generating assembly 120 to guide more propulsion airflows F to flow through the heat-generating assembly 120. Furthermore, the structural reinforcement plate 140 extends, for example, from the head end 111 to the propulsion assembly 130 at the tail end 113 to further enhance the structural strength of the body 110.

Figure 4:
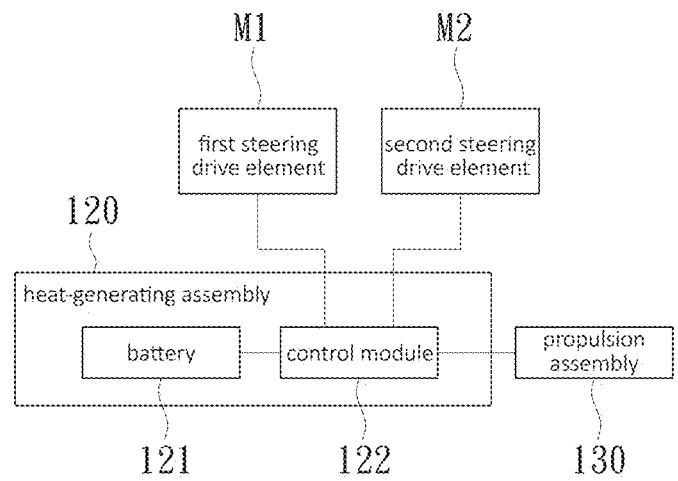
FIG. 4 is a block diagram of the unmanned aerial device in FIG. 1.

FIG. 4 is a block diagram of the unmanned aerial device in FIG. 1. Reference is made to FIG. 2 and FIG. 4 together. In this embodiment, the heat-generating assembly 120 includes, for example, a battery 121 and a control module 122 (both drawn in FIG. 3). The control module 122 is electrically connected to the battery 121 and the propulsion assembly 130. For example, the control module 122 can include a flight control panel, and the battery 121 can supply power to the control module 122. The battery 121 in this embodiment can include a lithium battery, but the battery in other embodiments is not limited to this.

Reference is made to FIG. 1 and FIG. 2 again. In this embodiment, the propulsion assembly 130 includes, for example, a fan tube thruster, where the fan tube thruster can be electrically connected to the battery 121 and the control module 122 to be driven by electric power to generate the propulsion airflow F. However, in one embodiment, a power source of the propulsion assembly 130 includes, for example, fuel. In another embodiment, the power source of the propulsion assembly 130 can include a mixture of fuel and electric power, and the power source of the propulsion assembly 130 is not limited in the present invention.

Figure 5:
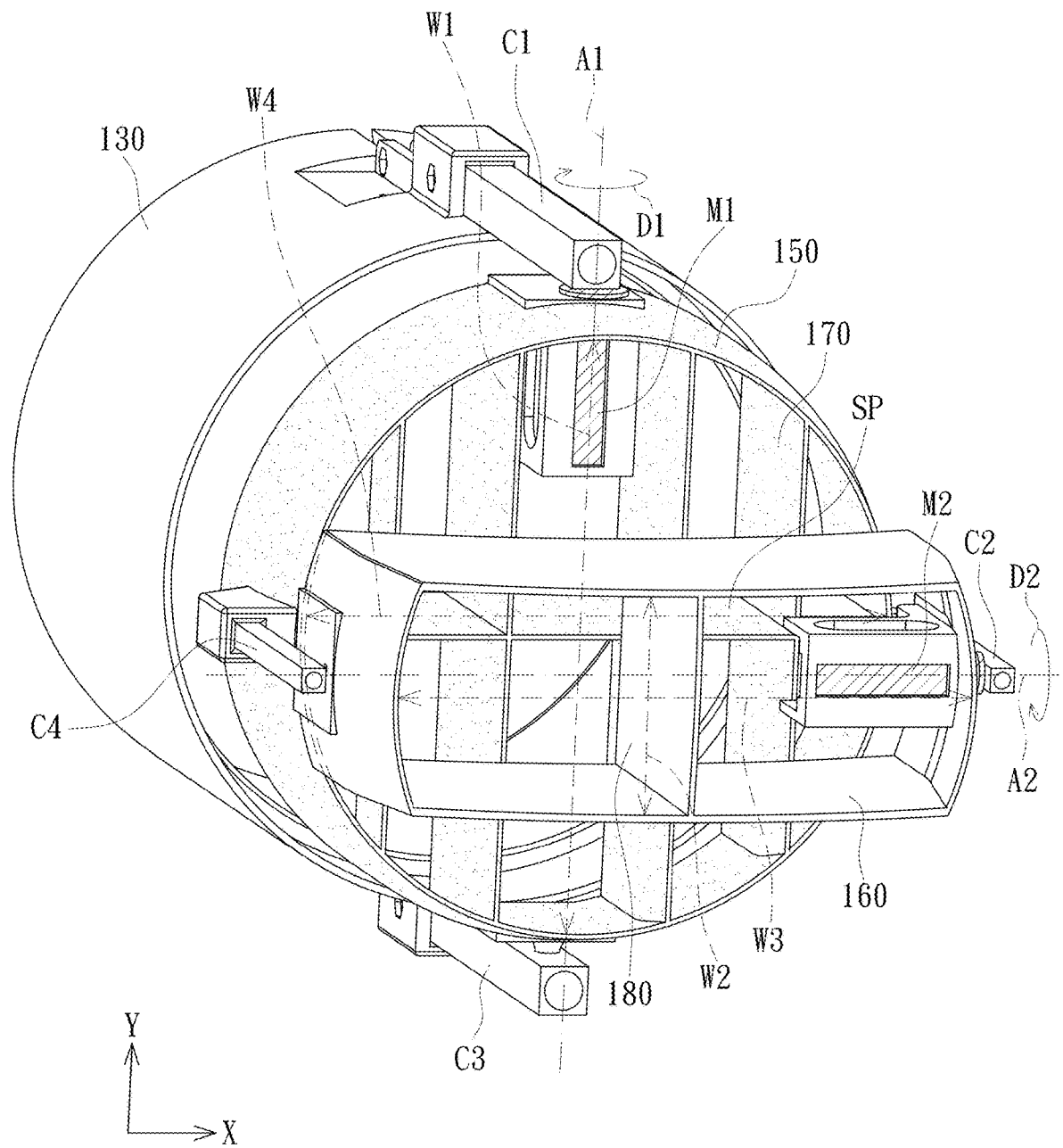
FIG. 5 is a three-dimensional schematic diagram of a propulsion assembly, a first fairing, and a second fairing in FIG. 1.

FIG. 5 is a three-dimensional schematic diagram of the propulsion assembly, a first fairing and a second fairing in FIG. 1, where a fan of the propulsion assembly 130 in FIG. 1 is omitted in FIG. 5, thereby clearly showing other features of the unmanned aerial device 100. Reference is made to FIG. 1 and FIG. 5 together. In this embodiment, the unmanned aerial device 100 can further include the first fairing 150 and the second fairing 160 (both marked in FIG. 2 and FIG. 3), where the first fairing 150 is connected to the side of the propulsion assembly 130 facing away from the tail end 113; and the second fairing 160 is connected to the side of the first fairing 150 facing away from the propulsion assembly 130. The first fairing 150 is adapted to swing relative to the propulsion assembly 130 in a first direction D1. The second fairing 160 is adapted to swing together with the first fairing 150 relative to the propulsion assembly 130 in the first direction D1 and is adapted to swing relative to the first fairing 150 in a second direction D2. Specifically, the first fairing 150 and the second fairing 160 can change the discharge direction of the propulsion airflow F, such that the unmanned aerial device 100 can change the flight attitude by means of swinging of the first fairing 150 and the second fairing 160, thereby turning. For example, reference is made to FIG. 5 continuously, the first fairing 150 can have a rotating axis A1, and the first fairing 150 is adapted to swing in the first direction D1 by taking the rotating axis A1 as an axis. Similarly, the second fairing 160 has, for example, a rotating axis A2, and the second fairing 160 can swing in the second direction D2 by taking the rotating axis A2 as an axis. The rotating axis A1 and the rotating axis A2 can be substantially perpendicular to each other, but the present invention is not limited to this.

In this embodiment, the unmanned aerial device 100 further includes, for example, a first connector C1, a first steering drive element M1, a second connector C2, and a second steering drive element M2. The first connector C1 is fixed to the propulsion assembly 130. The first steering drive element M1 is connected to the first connector C1 and the first fairing 150 and is adapted to drive the first fairing 150 to swing relative to the first connector C1 in the first direction D1. The second connector C2 is fixed to the first fairing 150. The second steering drive element M2 is connected to the second connector C2 and the second fairing 160 and is adapted to drive the second fairing 160 to swing relative to the second connector C2 in the second direction D2. Specifically, the first steering drive element M1 can be disposed in the first fairing 150 and is connected to the first connector C1 by means of the first fairing 150. Similarly, the second steering drive element M2 can be disposed in the second fairing 160 and is connected to the second connector C2 by means of the second fairing 160. Besides, as shown in FIG. 4, the first steering drive element M1 and the second steering drive element M2 can be electrically connected to the control module 122, such that the first steering drive element M1 and the second steering drive element M2 can be controlled by means of the control module 122, thereby adjusting the flight attitude of the unmanned aerial device 100. For example, the first steering drive element M1 and the second steering drive element M2 each comprise an electric motor, but other embodiments are not limited to this.

Reference is made to FIG. 5. In this embodiment, in a direction Y parallel to the rotating axis A1, the width W2 of the second fairing 160 is less than the width W1 of the first fairing 150. Thus, a propulsion force generated by discharging the propulsion airflow F from the second fairing 160 can be further enhanced, and the second fairing 160 can more precisely adjust the flight attitude of the unmanned aerial device 100 (marked in FIG. 1), that is, the second fairing 160 and the first fairing 150 can respectively control the pitch and the yaw of the unmanned aerial device 100. Incidentally, in a direction X perpendicular to the rotating axis A1, the width W3 of the second fairing 160 can be approximately equal to the width W4 of the first fairing 150, which is not limited in the present invention. In this embodiment, the first fairing 150 can be in the shape of a hollow cylinder, and the width W1 can be approximately equal to the width W4. On the other hand, the second fairing 160 can be in a shape similar to a hollow quadrangular column, but the shapes of the first fairing 150 and the second fairing 160 are not limited in the present invention.

In this embodiment, the unmanned aerial device 100 further includes, for example, a plurality of airflow deflectors 170 and 180. The airflow deflectors 170 are fixed in the first fairing 150, the airflow deflectors 180 are fixed in the second fairing 160, and the airflow deflectors 170 and 180 extend in the direction Y. Thus, the first fairing 150 and the second fairing 160 can more precisely adjust the flight attitude of the unmanned aerial device 100, thereby improving the controllability of the unmanned aerial device 100. Specifically, the airflow deflectors 170 are connected to two opposite sides of the first fairing 150 in the first fairing 150 in the direction Y. Similarly, the airflow deflectors 180 are connected to two opposite sides of the second fairing 160 in the second fairing 160 in the direction Y. What is worth mentioning is that the airflow deflectors 170 fixed in the first fairing 150 can be substantially parallel to the structural reinforcement plate 140 (drawn in FIG. 2 and FIG. 3), such that coordinates of a flight control system can be more precisely defined, thereby more precisely adjusting the flight attitude of the unmanned aerial device 100. Similarly, the airflow deflectors 180 fixed in the second fairing 160 can also achieve the effect of supporting the second fairing 160, thereby improving the structural strength of the second fairing 160. On the other hand, the first fairing 150 can also be provided with a support plate SP, and the support plate SP is, for example, substantially perpendicular to the airflow deflectors 180, thereby improving the structural strength of the first fairing 150.

Incidentally, in this embodiment, the unmanned aerial device 100 can further include a third connector C3, and a fourth connector C4, where the third connector C3 is arranged opposite to the first connector C1. The third connector C3 is fixed to the propulsion assembly 130 and is pivotally connected to the first fairing 150. The fourth connector C4 is opposite to the second connector C2. The fourth connector C4 is fixed to the first fairing 150 and is pivotally connected to the second fairing 160. Specifically, the rotating axis A1 of the first fairing 150 passes through, for example, the first connector C1 and the third connector C3, such that the first fairing 150 can swing in the first direction D1. Besides, the rotating axis A2 of the second fairing 160 can pass through the second connector C2 and the fourth connector C4, such that the first fairing 150 can swing in the second direction D2.

Compared with known techniques, the unmanned aerial device 100 in this embodiment uses the body 110 with the airflow guide space 112, and the heat-generating assembly 120 is disposed in the airflow guide space 112. Furthermore, the propulsion airflow F generated by the propulsion assembly 130 can flow through the heat-generating assembly 120 and then be discharged out of the body 110 from the exhaust vent O2 after passing through the heat-generating assembly 120. Therefore, the propulsion airflow F generated by the propulsion assembly 130 can quickly dissipate the heat of the heat-generating assembly 120 out of the body 110, thereby effectively improving the heat dissipation efficiency of the unmanned aerial device 100. What is worth mentioning is that with regard to the unmanned aerial device 100, the air intake O1, the airflow guide space 112, and the exhaust vent O2 of the body 110 are used for forming a heat dissipation path of the airflow, and the propulsion airflow F serves as a heat dissipation airflow, such that an additional heat dissipation system (for example, a liquid cooling system) can be omitted in the unmanned aerial device 100, thereby achieving the effects of improving the heat dissipation efficiency and simplifying the structure at the same time. Incidentally, simplifying the structure can additionally lead to the advantages of low cost, easiness in assembly and maintenance, low weight, and capability of extending the range.

Figure 6:
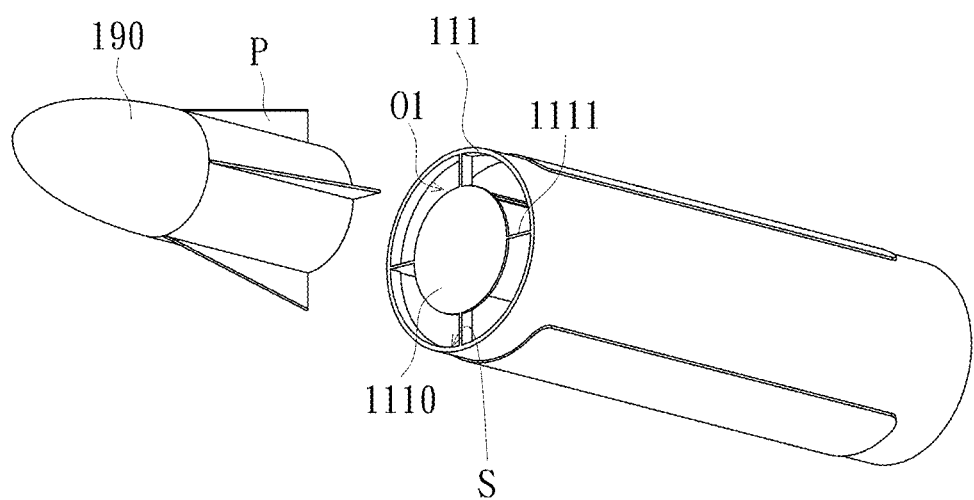
FIG. 6 is a separation schematic diagram of a nose and a body in FIG. 1.

FIG. 6 is a separation schematic diagram of a nose and the body in FIG. 1. Reference is made to FIG. 1 and FIG. 6. Incidentally, the unmanned aerial device 100 can further include the nose 190. The head end 111 further has, for example, a connecting part 1110 (drawn in FIG. 6). The nose 190 is fixed to the connecting part 1110 and exposes the air intake O1, such that the propulsion airflow F (drawn in FIG. 1) passes through the air intake O1. Specifically, the nose 190 can be equipped with a video camera or ammunition, which is not limited in the present invention. The head end 111 in this embodiment further has, for example, a plurality of rib parts 1111 (drawn in FIG. 6). The inner surface S of the body 110 extends to the head end 111 and surrounds the air intake O1. The air intake O1 surrounds the connecting part 1110, and the rib parts 1111 are connected to the connecting part 1110 and the inner surface S to fix the connecting part 1110 to the head end 111. In this embodiment, the air intake O1 can be annular and surround the connecting part 1110, the connecting part 1110 is, for example, in the shape of a circle, but the shape of the air intake O1 and the shape of the connecting part 1110 are not limited in the present invention. Besides, there may be four rib parts 1111 in this embodiment, but the present invention is not limited to this. In this embodiment, the nose 190 can also be equipped with a plurality of airflow deflectors P, and the airflow deflectors P can be fixed to the rib parts 1111, such that more propulsion airflows F can enter the air intake O1, thereby increasing the propulsion force and heat dissipation efficiency of the unmanned aerial device 100. Each airflow deflector P can be in the shape of a triangle, but these details are not limited in the present invention.

Figure 7:
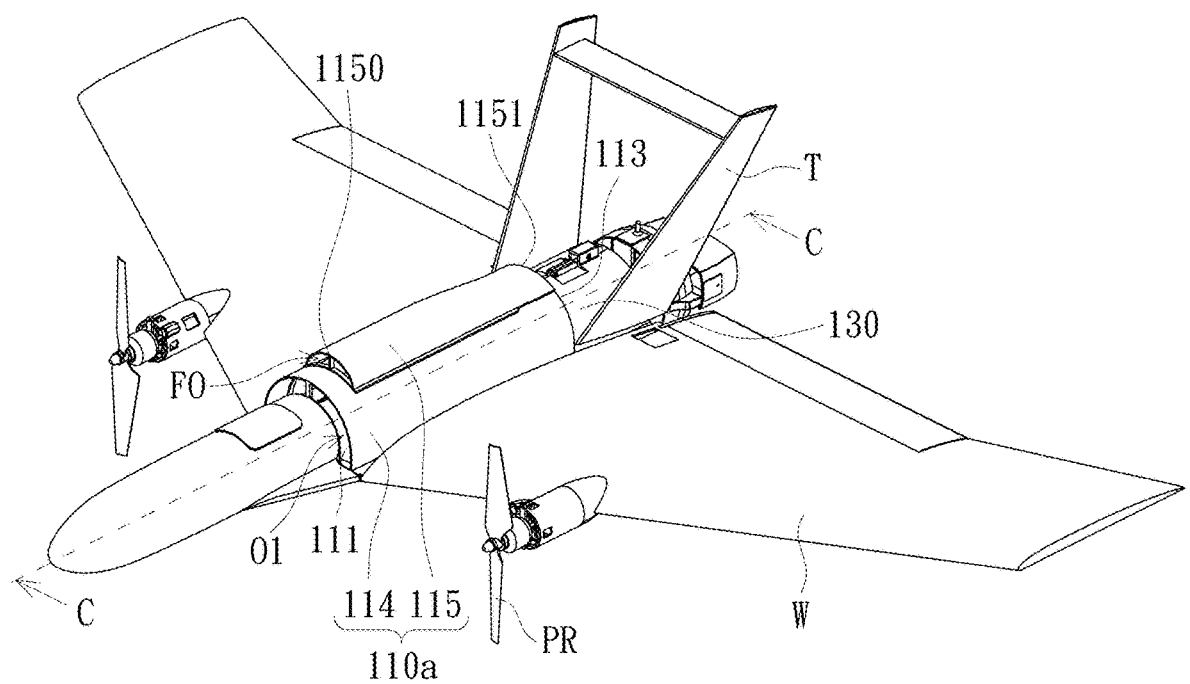
FIG. 7 is a three-dimensional schematic diagram of an unmanned aerial device in another embodiment of the present invention.
Figure 8:
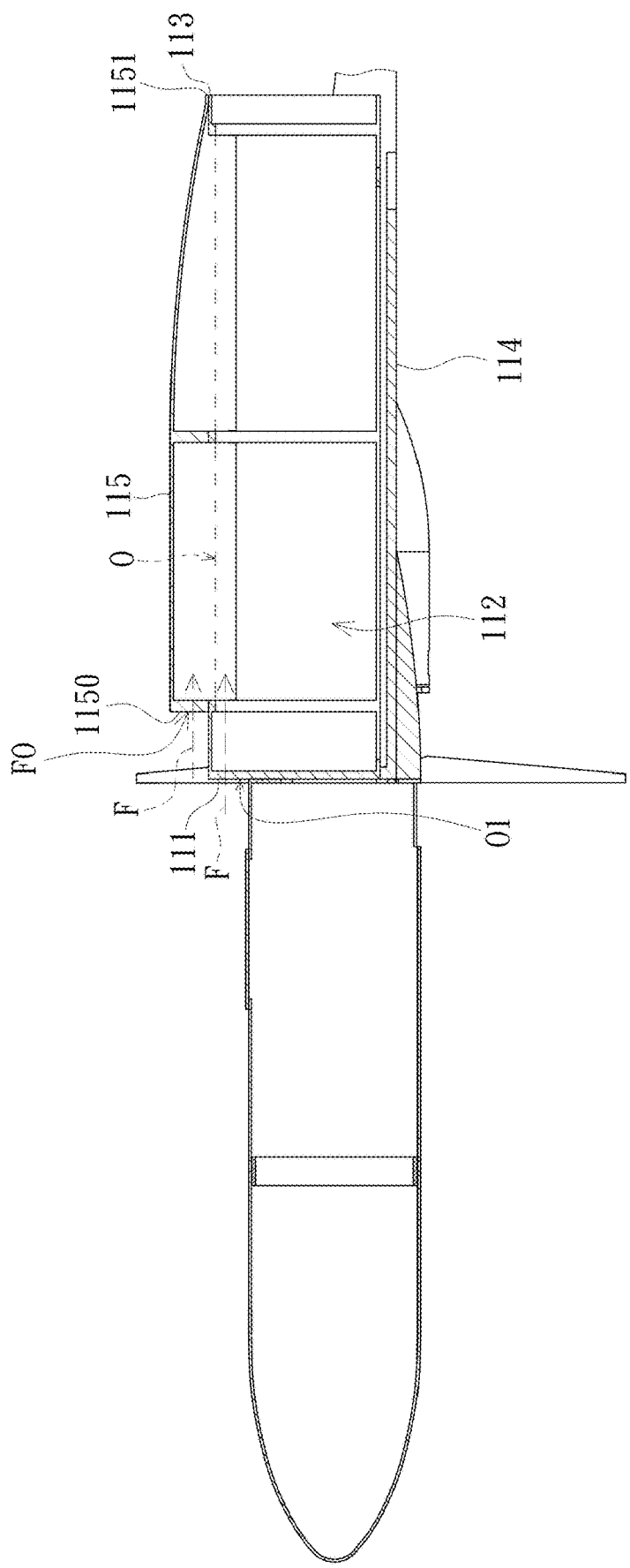
FIG. 8 is a cross-sectional view of the unmanned aerial device, taken along line C-C in FIG. 7.

FIG. 7 is a three-dimensional schematic diagram of an unmanned aerial device in another embodiment of the present invention. FIG. 8 is a cross-sectional view of the unmanned aerial device, taken along line C-C in FIG. 7. The structure and advantages of the unmanned aerial device 100a in this embodiment are similar to those of the embodiment in FIG. 1, and only the differences are explained below. Reference is made to FIG. 7 and FIG. 8. The body 110a can include a main body 114 and an airflow increase cover 115. The head end 111 and the tail end 113 are located on two opposite sides of the main body 114. The main body 114 surrounds the airflow guide space 112 (drawn in FIG. 8) and has an opening O (drawn in FIG. 8) communicated with the airflow guide space 112. The airflow increase cover 115 covers the opening O and has an airflow increase opening FO communicated with the opening O. The propulsion assembly 130 is more adapted to generate the propulsion airflow F through the airflow increase opening FO and the opening O. Therefore, the airflow increase cover 115 can increase the airflow entering the airflow guide space 112, thereby improving the heat dissipation efficiency of the unmanned aerial device 100a. Specifically, one part of the propulsion airflow F can enter the airflow guide space 112 through the air intake O1, and the other part of the propulsion airflow F can enter the airflow guide space 112 through the airflow increase opening FO and the opening O. Furthermore, the airflow increase cover 115 has, for example, a front side 1150 and a rear side 1151. The front side 1150 is opposite to the rear side 1151, and the front side 1150 faces the side of the body 110a having the head end 111. The airflow increase opening FO is located on the front side 1150 to increase the airflow entering the airflow guide space 112 through the airflow increase opening FO. It should be noted that the airflow increase cover 115 is not only disposed on the unmanned aerial device 100a in this embodiment, for example, in one embodiment, the airflow increase cover 115 can be disposed on the unmanned aerial device 100 in FIG. 1.

Incidentally, reference is made to FIG. 7 continuously, the unmanned aerial device 100a in this embodiment is further provided with, for example, wings W and a tail wing T, where the wings W can be further provided with propellers PR to further increase the propulsion power. It can be understood that the shapes of the wings W and the shape of the tail wing T can be changed according to actual needs, and are not limited to those shown in FIG. 7.

In conclusion, the unmanned aerial device in the present invention uses the body with the airflow guide space, and the heat-generating assembly is disposed in the airflow guide space. Furthermore, the propulsion airflow generated by the propulsion assembly can flow through the heat-generating assembly and then be discharged out of the body from the exhaust vent after passing through the heat-generating assembly. Therefore, the propulsion airflow generated by the propulsion assembly can quickly dissipate the heat of the heat-generating assembly out of the body, thereby effectively improving the heat dissipation efficiency of the unmanned aerial device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation to encompass all such modifications and similar structures.

What is claimed is:

1. An unmanned aerial device, comprising:
a body, having a head end, an airflow guide space, and a tail end, wherein the head end is opposite to the tail end, the airflow guide space is located between the head end and the tail end, the head end has an air intake, the tail end has an exhaust vent, and the airflow guide space is communicated with the air intake and the exhaust vent;
a heat-generating assembly, disposed in the airflow guide space; and
a propulsion assembly, connected to the tail end, wherein the propulsion assembly is adapted to generate a propulsion airflow passing through the air intake, the airflow guide space, and the exhaust vent;
wherein the unmanned aerial device further comprises a first fairing and a second fairing, wherein the first fairing is connected to a side of the propulsion assembly facing away from the tail end, the second fairing is connected to a side of the first fairing facing away from the propulsion assembly, the first fairing is adapted to swing relative to the propulsion assembly in a first direction, and the second fairing is adapted to swing together with the first fairing relative to the propulsion assembly in the first direction and is adapted to swing relative to the first fairing in a second direction.

2. The unmanned aerial device according to claim 1, wherein the heat-generating assembly comprises a battery and a control module, and the control module is electrically connected to the battery and the propulsion assembly.

3. The unmanned aerial device according to claim 1, further comprising a first connector, a first steering drive element, a second connector, and a second steering drive element, wherein the first connector is fixed to the propulsion assembly, the first steering drive element is connected to the first connector and the first fairing and is adapted to drive the first fairing to swing relative to the first connector in the first direction, the second connector is fixed to the first fairing, and the second steering drive element is connected to the second connector and the second fairing and is adapted to drive the second fairing to swing relative to the second connector in the second direction.

4. The unmanned aerial device according to claim 3, wherein the first fairing has a rotating axis, the first fairing is adapted to swing in the first direction by taking the rotating axis as an axis, and a width of the second fairing is less than a width of the first fairing in a direction parallel to the rotating axis.

5. The unmanned aerial device according to claim 4, further comprising a plurality of airflow deflectors, wherein the airflow deflectors are fixed in the first fairing and the second fairing and extend in the direction.

6. The unmanned aerial device according to claim 1, further comprising a structural reinforcement plate, wherein the body has an inner surface surrounding the airflow guide space, the inner surface is located between the head end and the tail end and has two side parts facing each other, and the structural reinforcement plate is located in the airflow guide space and is fixed to the two side parts.

7. The unmanned aerial device according to claim 6, wherein the heat-generating assembly is fixed to the structural reinforcement plate.

8. The unmanned aerial device according to claim 6, wherein the structural reinforcement plate extends from the head end to the tail end.

9. The unmanned aerial device according to claim 1, wherein the body comprises a main body and an airflow increase cover, the head end and the tail end are located on two opposite sides of the main body, the main body surrounds the airflow guide space and has an opening communicated with the airflow guide space, the airflow increase cover covers the opening and has an airflow increase opening communicated with the opening, and the propulsion assembly is adapted to generate the propulsion airflow passing through the airflow increase opening and the opening.

10. The unmanned aerial device according to claim 9, wherein the airflow increase cover has a front side and a rear side, the front side is opposite to the rear side, the front side faces a side of the body having the head end, and the airflow increase opening is located on the front side.

11. The unmanned aerial device according to claim 1, further comprising a nose, wherein the head end further has a connecting part, and the nose is fixed to the connecting part and exposes the air intake.

12. The unmanned aerial device according to claim 11, wherein the head end further has a plurality of rib parts, an inner surface of the body extends to the head end and surrounds the air intake, the air intake surrounds the connecting part, and the rib parts are connected to the connecting part and the inner surface.

* * * * *